United States Patent [19]
Pollard et al.

[11] Patent Number: 5,766,385
[45] Date of Patent: Jun. 16, 1998

[54] SEPARABLE FASTENER HAVING DIE-CUT PROTECTIVE COVER WITH PULL TAB AND METHOD OF MAKING SAME

[75] Inventors: Samuel White Pollard, Durham; Donald L. Banfield, Hudson; Peter E. Leach, Hooksett; Carol A. Watts, Pembroke; Lawrence E. Lacombe, Goffstown, all of N.H.

[73] Assignee: Velcro Industries B.V., Curacao, Netherlands

[21] Appl. No.: 568,132

[22] Filed: Dec. 6, 1995

[51] Int. Cl.[6] .................... B32B 31/18; A44B 21/00
[52] U.S. Cl. .................... 156/251; 24/442; 156/73.3; 156/227; 156/292; 458/100
[58] Field of Search .................... 156/66, 251, 515, 156/73.3, 73.1, 204, 227, 292; 24/442; 428/100

[56] References Cited

U.S. PATENT DOCUMENTS

| | | | |
|---|---|---|---|
| 4,563,380 | 1/1986 | Black et al. | 428/100 |
| 4,673,542 | 6/1987 | Wigner et al. | 264/46.7 |
| 4,693,921 | 9/1987 | Billarant et al. | 428/100 |
| 4,710,414 | 12/1987 | Northrup et al. | 428/43 |
| 4,732,631 | 3/1988 | Shimizu | 156/251 |
| 4,767,482 | 8/1988 | Diez | 156/251 |
| 4,802,939 | 2/1989 | Billarant et al. | 156/155 |
| 4,814,036 | 3/1989 | Hatch | 156/245 |
| 4,881,997 | 11/1989 | Hatch | 156/66 |
| 4,931,344 | 6/1990 | Ogawa et al. | 428/100 |
| 4,933,224 | 6/1990 | Hatch | 428/100 |
| 4,993,035 | 2/1991 | Billarant et al. | 156/155 |
| 4,999,081 | 3/1991 | Buchara | 156/251 |
| 5,061,540 | 10/1991 | Cripps et al. | 428/100 |
| 5,180,618 | 1/1993 | Kessler et al. | 428/100 |
| 5,260,015 | 11/1993 | Kennedy et al. | 264/167 |
| 5,286,431 | 2/1994 | Banfield et al. | 264/134 |
| 5,292,468 | 3/1994 | Colombani | 264/130 |
| 5,422,156 | 6/1995 | Billarant | 428/100 |

FOREIGN PATENT DOCUMENTS

06 21 118 A1  10/1994  European Pat. Off. .
2405123  5/1979  France .

*Primary Examiner*—Daniel Stemmer
*Attorney, Agent, or Firm*—Steven J. Weissburg

[57] ABSTRACT

A fastening component for use with molded articles has a base with fastening elements upstanding therefrom and a relatively thin, protective cover attached thereto. The cover is attached to the base by thermal processes. For instance, the cover and the base can be cut into a shape by a die that substantially simultaneously cuts the shape from a larger web of both and joins the two pieces together by heat induced processes, such as welding. The shaped piece may be rectilinear or curved or any complex shape. The cover may include a pull tab at one or both ends. The pull tab is formed from the cover material itself, a piece of which is folded over on itself and cut and sealed to adjacent layers at the same time that the main shape is being cut and sealed. For some embodiments of the pull-tab, rather than heat sealing the protective cover to the base, an adhesive can be used.

30 Claims, 6 Drawing Sheets

SEPARABLE FASTENER HAVING DIE-CUT PROTECTIVE COVER WITH PULL TAB AND METHOD OF MAKING SAME

BACKGROUND

The present invention relates to touch fasteners in general, and more specifically, to touch fasteners for incorporation by molding into molded articles.

Hook and loop type separable touch fasteners, such as those sold under the trademark Velcro®, are well-known and are used to join two members detachably to each other. This type of fastener has two components. Each has a flexible base material having one component of the fastening system on a fastening surface thereof. One component is typically comprised of resilient hooks while the other is comprised of loops, and when the two surfaces are pressed together they interlock to form a releasable engagement.

Separable fasteners are used in the manufacture of automobile seats in the attachment of an upholstered seat cover to a polyurethane foam bun. One portion of the separable fastener is incorporated onto the surface of the polyurethane foam bun during the foam molding process. The mating portion of the separable fastener is attached to the seat cover to provide releasable attachment to the foam bun. The separable fastener assembly used in the foam mold for incorporation in the bun surface typically comprises the hooked portion of a separable fastener. This hook portion is characterized by a base carrying resilient hooks on a fastening surface. The opposite, non-fastening surface of the base may carry anchor projections to become incorporated into the foam to provide stable attachment of the separable fastener assembly to the foam article. It is also common for a backing layer or substrate to mate with the non-fastening face of the base. The substrate may be of a material that is more conducive to handling of the component or its adherence to other articles. Alternatively, the backing layer may be looped fabric, to which the foam material adheres well. Anchor projections may also project from the substrate. Further, other components can be sandwiched between the substrate and the base. The assemblies may be referred to as "mold-in" fasteners or assemblies, due to their use in such molded products.

A protective layer, such as a thin plastic film, may be placed over the resilient hooks, to prevent incursion of foam into the hooks during the molding process, since significant foam contamination of the hooks would affect their ability to engage with the mating portion of the fastener attached to the seat cover. Alternatively, an elastomeric cover that intimately surrounds the hooks, except for a small portion at their tips, can also be used. After the molded article is fabricated and removed from the mold, the plastic film layers or elastomeric material is removed.

In some assemblies, a magnetically attractive solid metal shim is attached to the base to facilitate placement of the assembly in a valley (also known as a trench or trough) of the mold cavity wall, which is equipped with magnets. The shim helps secure the hook-carrying face of the component tightly against the mold wall, thereby further minimizing incursion of the foam into the hooks.

The protective film layer is typically formed in a web and then fixed to the fastening element component. The fixing can be accomplished by ultrasonic welding or adhesive. The adhesive may be hot melt or room temperature acting or pressure sensitive.

After the molding process is completed, the molded article is removed from the mold and, in some cases, the protective cover remains on the fastening component. If that is the case, it must be removed before use. It can be removed by tearing it from its attachment to the fastening component, either tearing apart the film layer, or the interface between the film layer and the fastening component, depending on the relative strengths thereof and the design of the product.

Rather than removing the cover, some types of covers disintegrate or shrink in size during the heat of the molding process so that they do not interfere with operation of the fastening elements after removal from the mold.

Regarding attaching the cover to the fastening element components, the known methods have drawbacks. Adhesives add to the cost and complexity of the product, requiring application of the adhesive and special handling to avoid adhering the adhesive bearing component at the wrong time to the wrong place. Further, the adhesive must be activated. Using an adhesive is relatively straightforward for strip shaped or rectangular parts, and manufacture of such parts can be automated. However, there are many fasteners that are not so regularly shaped, such as arcuate shaped pieces. Application of the adhesive to these non-rectilinear pieces is additionally complicating.

Ultrasonic welding does not have the same drawbacks as the adhesives. However, there are other problems. The cost of the ultrasonic tooling is very high, and it is difficult to use ultrasonic welding on non-rectilinear parts. Further, the size of the ultrasonic "horn" is limited. Therefore, large parts may not be formable using ultrasonic technology.

Regarding removing the cover after molding, the known methods also have drawbacks. If the cover has no specialized means for removing it, the assembly line worker must hold a special tool for cutting the cover, and then must strip it from the part, either by hand, or with the aid of the same tool or another tool. This necessitates holding the tool at all times, or picking it up and replacing it, which slows down the production process. Further, the strip is then split, and can break down into more than one part, each of which must be removed. It is known, for instance according to U.S. Pat. No. 5,422,156, issued June 6, 1995, to Billarant, to attach a tab to a cover. The tab and cover arrangement disclosed is a set of hook and loop pairs that are folded back on themselves.

Accordingly, for the foregoing reasons, there is need for a fastening component for use in molded articles, that has a protective cover attached thereto, which does not depend on adhesives or ultrasonic welding to secure the protective cover to the fastening element component. There is also a need for such mold-in fastening components of an arbitrary shape and a simple and low cost design. Need also exists for a covered fastening component, where the cover is designed to be easily removable after the molding process is completed, without requiring use of a special cover removing tool, and where the cover reliably detaches from the fastening component.

SUMMARY

A preferred embodiment of the invention is a component of a two component separable fastener. The component comprises a base comprising an extent along a first dimension and an extent along a second dimension; and a fastening surface and a non-fastening surface. Carried on the fastening surface of the base is a plurality of fastening elements. A cover is adhered directly to the base by a heat induced weld and substantially covers the fastening elements. Typically, the edges of the fastening component are hot-knife-cut edges. The base and the cover typically comprise a thermoplastic, such as polyamide. The cover may be of a material chosen from the group consisting of polyamide, polyester, vinyl and polyethylene, in one or more layers. A layer of hot-melt adhesive or thermoset adhesive may also be included with a polymeric layer, such as one of the foregoing. The shape may be rectilinear, or partially comprising a non-straight curve.

The cover is adhered to the base to a degree such that if the covered base is contacted with liquid molding material for molding a molded article, the molding material will be prevented from contacting the fastening elements during a molding process. Typically the fastening elements are hook-like elements.

According to another preferred embodiment, the invention is a component of a two component separable fastener. The component comprises a base comprising: an extent along a first dimension and an extent along a second dimension; and a fastening surface and a non-fastening surface. Carried on the fastening surface of the base, is a plurality of fastening elements. A cover is adhered directly to the base and substantially covers the fastening elements. The cover comprises a primary sheet; and a secondary, sheet that is adhered to and overlies a portion of the primary sheet and that has an edge that is not adhered to the primary sheet. Thus, a tab is formed for removing the cover from the base.

The primary sheet of the cover is held closely to the fastening surface to a degree sufficient-to prevent fouling of the fastening elements by any molding material for forming a molded article, that contacts the cover. The primary sheet of the cover is typically adhered to the fastening surface substantially around the entire periphery of the first and second extents of the base. The secondary sheet is adhered to the primary sheet by a heat induced weld, or by an ultrasonic weld or by adhesives. The primary sheet may also be adhered to the base by any of these three techniques. If an adhesive is used, it is preferably a backing layer of the primary sheet. Typically, the primary sheet and the secondary sheet comprise parts of a single original sheet that has been folded over onto itself. The fold may be a simple fold, or a compound fold, and it may have an open edge toward the edge of an elongated component, or toward the center of such a component. The cover may be a polyamide or a polyester, or other suitable thermoplastic. It may be a unitary layer, or a composite of several layers of different materials. The cover is adhered to the base with a strength relative to the tear strength of the cover such that if the non-adhered edge of the secondary sheet is pulled, the cover detaches from the base in substantially one piece.

Still another preferred embodiment of the invention is a method of making a fastening component comprising the steps of providing a base layer carrying on a fastening surface a field of fastening elements and providing a protective sheet adjacent and overlying the base layer, such that a portion of the protective sheet overlies the field of fastening elements and a different portion of the protective sheet extends beyond the field of fastening elements. Substantially simultaneously, the following steps are performed: cutting from the base layer and from the overlying protective sheet, a piece of each of a substantially congruent and coextensive shape; and adhering the cut piece of the protective sheet to the cut piece of the base layer, substantially completely around the perimeter of the field of fastening elements. Thus, a tab is formed in the cover for pulling it from the base.

The base layer and the overlying protective sheet are typically cut substantially simultaneously with the same hot blade, while pressing the base and protective sheet layers together with a hot die that adheres the protective sheet to the base layer by thermal processes. Rather than thermal processes, ultrasonic processes may be used for this step. Before conducting the step of substantially simultaneously cutting and adhering, the step of substantially flattening a region of the fastening elements along a perimeter region of the base layer may be conducted. The shape of the fastening component may be rectilinear or arcuate or any arbitrary shape. The base layer and the protective sheet may be coextruded. The protective sheet may comprise an adhesive layer adjacent to the fastening surface.

Another preferred embodiment of the invention is a fastening component made according to the method of the invention mentioned above.

Yet another preferred embodiment of the invention is a method of making a fastening component comprising the steps of providing a base layer carrying on a fastening surface a field of fastening elements and providing a protective sheet adjacent and overlying the base layer, such that a portion of the protective sheet overlies the field of fastening elements and a portion of the protective sheet extends beyond the field of fastening elements. The extending portion of the protective sheet is folded back onto the portion of the protective sheet that overlies the field of fastening elements. The base layer and the overlying protective sheet are cut to a substantially coextensive, shape; and the protective sheet is adhered to the base layer, substantially completely around the entire perimeter of the field of fastening elements.

The step of folding the extending portion of the protective sheet may comprise the step of folding the sheet onto itself in a simple fold with exactly one crease or in a compound fold with two or more creases. The cut shape is generally elongated, and the folding step results in an open edge that opens either toward an elongated end of the shape or toward its center, along the elongated dimension.

According to another preferred embodiment, the invention is a fastening component having a pull tab, made according to the immediately above described method.

Still another preferred embodiment of the invention is a method of making a fastening component comprising the steps of providing a base layer carrying on a fastening surface a field of fastening elements; and providing a protective sheet adjacent and overlying the base layer, such that a primary portion of the protective sheet overlies the field of fastening elements and a secondary portion of the protective sheet extends beyond the field of fastening elements. The extending portion of the protective sheet is folded back onto the portion of the protective sheet that overlies the field of fastening elements. A piece is cut from the base layer and from the overlying protective sheet, the pieces comprising a substantially coextensive shape. Substantially simultaneously, the cut piece of the protective sheet is adhered to the cut piece of the base layer, substantially completely around the entire perimeter of the field of fastening elements. The base layer and the overlying protective sheet are cut substantially simultaneously with the same hot blade, while pressing the base and protective sheet layers together with a hot die that adheres the protective sheet to the base layer by thermal processes. Rather than using a blade to cut the pieces, ultrasonic techniques can be used. In some cases, the fastening components around the perimeter of the base layer are flattened before the cover is adhered to it. The shape may be a parallelepiped or arcuate or any other shape. The step of providing a protective sheet adjacent and overlying the base layer, may comprise the step of coextruding the base layer and the protective cover simultaneously. The protective sheet may comprise an adhesive covering the surface of the sheet that is adjacent to the fastening surface of the base layer. The folding step may comprise the step of folding the sheet back onto itself in a simple fold with exactly one crease or a compound fold with two or more folds.

Another preferred embodiment of the invention comprises a fastening component of an arbitrary shape having a pull tab, made according to the method described immediately above.

BRIEF DESCRIPTION OF THE DRAWINGS

These and other features, aspects, and advantages of the present invention will become better understood with regard to the following description, appended claims and accompanying drawings, where:

DETAILED DESCRIPTION

Figure 1:
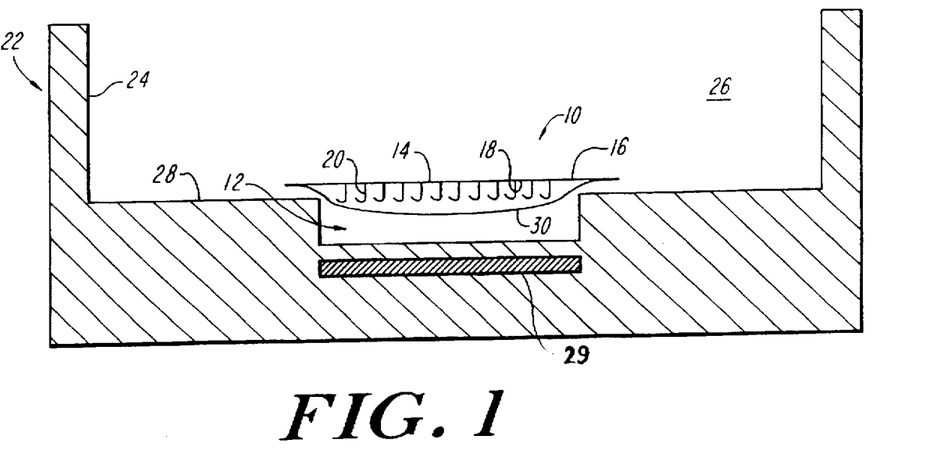
FIG. 1 is a cross-sectional elevation view of an embodiment of a fastening component of the invention in place in a mold for forming a molded product.

A preferred embodiment of the present invention is shown schematically in FIG. 1. A fastening component 10 of the invention is shown schematically. A base 14 has two surfaces: a fastening surface 18 and a non-fastening surface 16. The structure of the base may be woven or non-woven. The invention is not limited by the mechanical structure of the base, and any known mechanical form of base for separable touch-type fasteners is believed to be consistent with the invention. The material of the base is typically a plastic, but may be any other suitable material. The material must be amenable to joining to another member by heat techniques (except for one embodiment of the pull-tab of the invention, discussed below, where adhesives may be used for joining the cover to the base). Often, the base is a plastic base and it is attached to a separate substrate (on the non-fastening face) of a different material. If the base is a woven structure, the base portion may be referred to as a "ground fabric."

In a preferred embodiment, the base presents on its fastening surface 18, a plurality of hook-type elements 20. The hook-type elements may be shaped as hooks, or mushrooms or two tined anchors, or any other mechanical form of hook-type element used for separable touch-type fasteners, which engage loop-type elements, as is known in the art. Such elements are referred to herein as "hook-type", or "hook-like" or "hook-" elements, whether or not they are in the shape of hooks. Any known mechanical form, and any as yet unknown mechanical form of hook elements is believed to be consistent with the invention. (The invention may also be incorporated into the loop carrying portion of a fastener pair.)

The fastening component 10 is used in a mold 22, having a main mold wall 24 surrounding a main cavity 26. A fastening element-receiving mold valley 12 is in the bottom wall 28 of the mold. Embedded in the bottom wall 28 is a magnet 30, such as is known in the art. It is also common to include a pedestal in the bottom wall, and to locate the fastening component on the pedestal. A pedestal may be used if it is desired to have the fastening component below the surface of the article that is being molded, such as in a simulated seam.

The fastening component 10 is inserted into the mold, adjacent the fastening element-receiving valley 12, with the hooks 20 facing into the valley 12. The magnet 29 attracts the fastening component 10 toward the bottom mold wall 28, due to a magnetically attractive component (not shown) contained in the fastener 10. The magnetically attractive component may be a metal shim, located anywhere within the body of the fastener. The shim may be porous, as described in co-pending, co-assigned U.S. patent application Ser. No. 08/568,010 in the names of the same inventors herewith, entitled TOUCH FASTENER WITH POROUS METAL CONTAINING LAYER, filed on even date herewith, which is fully incorporated herein by reference. A porous metal layer has many advantages. It reduces the weight and the cost of the product. It increases the product's flexibility and facilitates incorporation of the shim between a base layer and a separate substrate layer. The magnetic attraction secures the fastening component to the mold wall, thereby preventing the incursion of the molding material among the fastening elements.

Rather than using a metal shim, either porous or non-porous, it is also possible to disperse a magnetic attractant throughout the body of the fastening component, for instance by fabricating the hooks from a plastic resin that contains a sufficient quantity of magnetically attractable particles. Such a structure is more fully described in co-pending, co-assigned U.S. patent application Ser. No. 08/390,876, entitled TOUCH FASTENER WITH MAGNETIC ATTRACTANT, filed on Feb. 17, 1995, which is fully incorporated herein by reference.

A relatively thin cover 30 is secured to the base 14 substantially all around the perimeter of the fastening component, typically at the edges. (Another embodiment is discussed below, where the cover is attached to the base at other locations within the zone principally occupied by the fastening components. The cover also helps to prevent molding material from fouling the fastening elements 20, since it is sealed around the perimeter to prevent molding material from intruding.

The next step in the molding process is to introduce the molding material into the mold. The molding material may constitute a single component, or there may be multiple components that are mixed as they are introduced into the mold, or before. The molding material cures to a stable foam, the mold is opened, and the molded part is removed.

The article thus formed carries a fastening component on it surface. Any anchor features are intimately associated with the molding material, thereby embedding the fastening component into the molded article. One type of anchoring feature is an anchoring element that is much like a hook element. It is not necessary that such anchoring elements be used, and there are many known ways that do not use them. For instance, rather than the anchors, a backing layer of fiber loops can be used, which are infiltrated by the foaming material, thereby anchoring the fastener to the foam body. A typical type of molded article is a foam seat cushion, such as for an automobile or airplane. Rather than foam, other types of molded materials are also suitable. The temperatures of molding the larger article should be lower than the melt temperature of the material that is being molded into the larger article.

Figure 2:
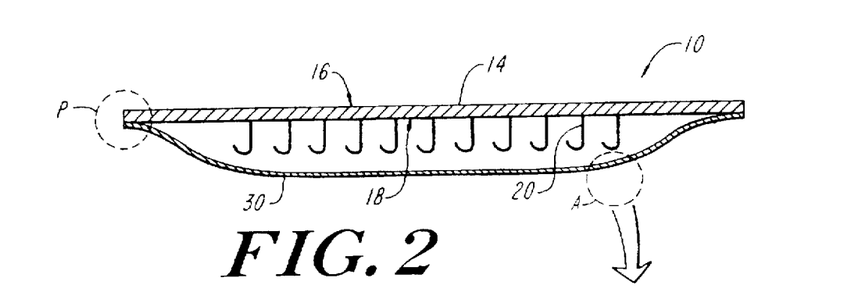
FIG. 2 is a cross-sectional elevation view of an embodiment of a fastening component of the invention.

The structure of a basic embodiment of the fastening component of the invention is shown schematically in cross-section in FIG. 2. The fastening component base 14 has fastening elements, such as hooks 20, upstanding from its fastening face 18. A relatively thin cover 30 is also secured to the base 14 in a manner described below, so that an envelope is formed around the hooks 20 to protect them from being fouled by molding material. The cover 30 is secured to the base 14 in a perimeter region P, where there are no fastening elements, or where any fastening elements have been reduced in size, such as by crushing, so as to present a relatively low profile region for attachment of the cover to the base. The attachment is typically by heat welding, or fusion, but may also be by adhesive, especially in connection with the pull-tab embodiment of the invention shown in FIG. 6A, discussed below.

The cover 30 may be of any material that can prevent molding material from intruding into the fastening element region and that can be secured by heat techniques to the base 14. For instance, as shown at the region A, shown enlarged in FIG. 2A, the cover 30 may consist of three layers, $30_i$, $30_t$, and $30_o$. The inside layer, $30_i$, may advantageously be a vinyl, which bonds well to the fastening face of the base 14, which is typically made of a polyamide, such as nylon. If the base is made of a different material, that must be taken into consideration in choosing the material for this inner layer. A principal consideration is that the inside layer should be readily attachable to the base layer by heat techniques, such as welding, melting or hot-melt adhesive. By "welding" it is meant joining under heat and pressure, either by melting of one or both layers and adherence together, or by adherence without melting, under pressure. Other suitable materials for this inside layer include but are not limited to polyamide, hot-melt adhesives, polyester, thermoset adhesives, and coextruded films of polyester and nylon. The outside layer, $30_o$, may advantageously be a polyethylene, which has good resistance to degradation by the heat and chemical nature of foaming materials, and is also relatively strong and inexpensive. Other suitable outside layers include but are not limited to the polyolefin material sold by Du Pont de Nemours and Co. under the tradename Surlyn. In general, materials with similar melting points tend to be compatible for heat sealing.

Figure 2A:
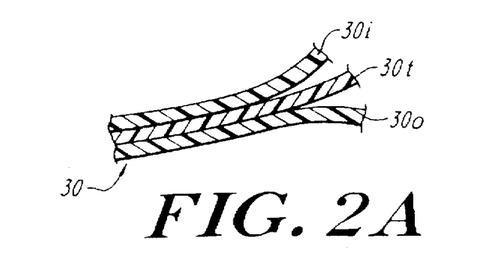
FIG 2A is an enlargement of the portion A shown in FIG. 2.

The middle layer, $30_t$, is an optional tie layer for tying the two marginal layers $30_i$ and $30_o$ together, and should be any material that is light and inexpensive and that is chemically and mechanically conducing to the tying function. For instance, for vinyl and polyethylene layers, a suitable tie layer material is nylon. Other suitable materials for this tie layer include but are not limited to thermoset adhesives and thermoplastic adhesives or films. For a polyamide inside layer $30_i$, and a polyethylene outside layer $30_o$, which is also typical, no tie layer is required.

The present invention is particularly suited to making protectively covered fastening components of any arbitrary shape. This is particularly advantageous, because many known methods can only produce generally rectangular or regular parallelepiped shapes, and there are many applications that require other shapes, such as an arcuate shape.

Figure 4:
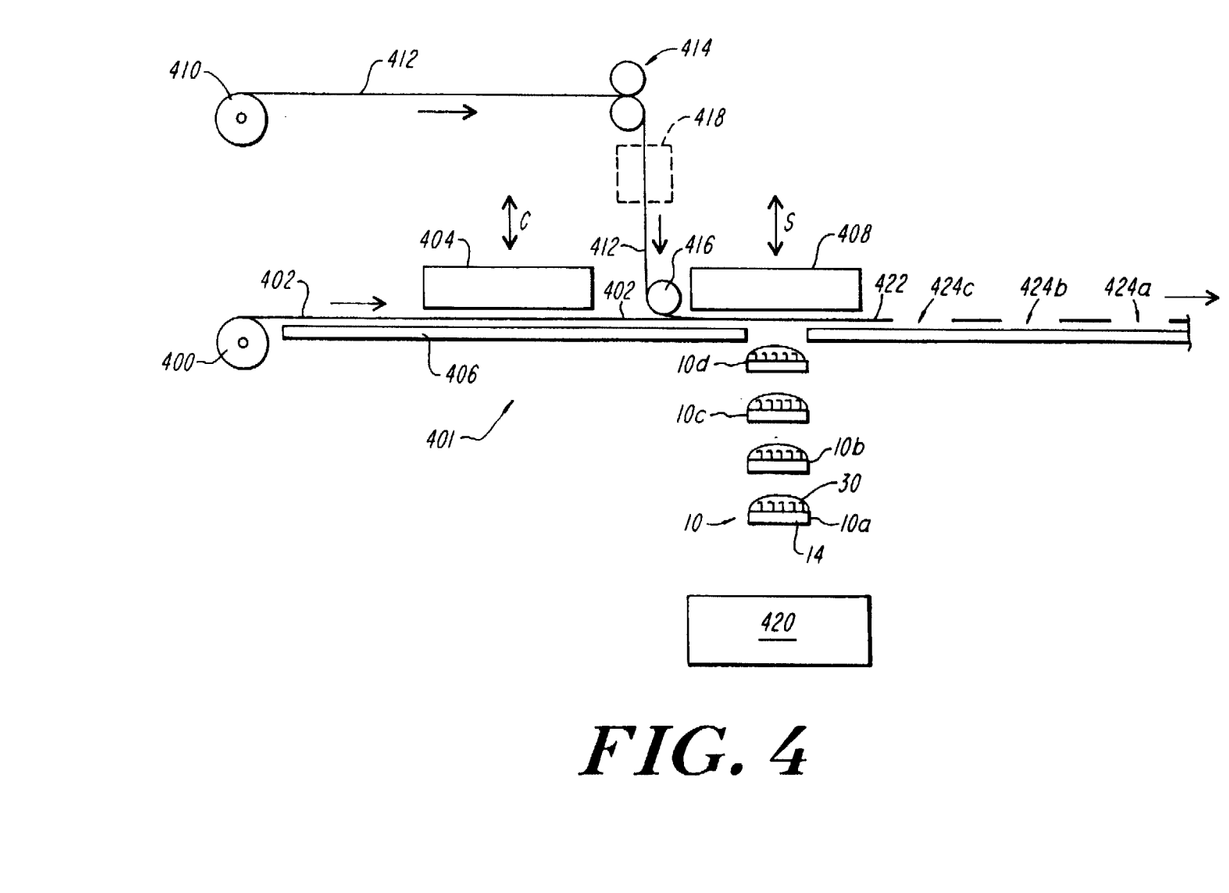
FIG. 4 is a cross-sectional side elevation view of an assembly line of machinery for assembling a web of fastening elements and a web of cover material, crushing portions of the fastening elements on the fastening component, and simultaneously sealing the two webs together and cutting a shaped article from the combined webs.

As shown schematically in FIG. 4, a roll 400 of fastener component is provided to a shape forming unit 401. The fastening component roll 400 may or may not include a magnetically attractive component, such as magnetically attractive hooks or base as described in the above mentioned U.S. Ser. No. 08/390,876, or a porous metal shim layer as described in the above mentioned U.S. Ser. No. 08/568,010 TOUCH FASTENER WITH POROUS METAL CONTAINING LAYER. These two forms of magnetically attractive fastening component are particularly conducive to the method of forming arbitrarily shaped fasteners, described below. The roll 400 may also include a separate backing substrate, although it need not. The roll 400 may be rather wide, such as from one foot (25 cm) to five feet (125 cm) (in the direction perpendicular to the plane in which FIG. 4 is drawn).

The web 402 of fastener component is indexed to a crushing die 404, which reciprocates up and down in the directions indicated by the double headed arrow C. The web reaches the crushing die 404 and then stops while an operation is performed upon it. This die 404 crushes the fastening components, typically hooks, in the regions where it is desired to attach the cover to the base. A bottom view of the crushing die 404 is shown schematically in FIG. 8. The die includes a raised heat platen 806 in an arcuate shape, which is the shape of the perimeter of the piece to be formed. The die is typically heated or it can be an ultrasonic horn, as is well known in the art. If heated, feedback controls are used. For instance, for a nylon fastening component base, a temperature of 425° F. (218° C.) is applied for three to five seconds. A support stage 406 backs up the web 402 during the crushing and other operations. This crushing stage may not be necessary for all applications, especially those where the base material is of a low melting point.

Figure 8:
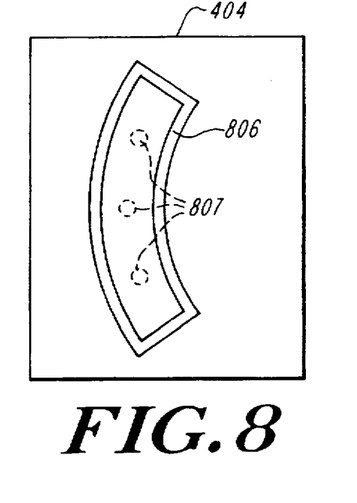
FIG. 8 is a plan bottom view of a crushing die shown schematically in FIG. 4.

The web 402 is next indexed to a combination cutting/sealing stage, under a combination cutting and sealing die 408. In some cases, it may be desired to seal the cover of the hooks inside the body of the fastening element region. In such cases, it is also desirable to crush the fastening elements in that region. This is accomplished by auxiliary crushing regions 807, shown in phantom.

Along another web feed line, the cover material is being prepared for combination with the fastening material. A roll 410 of the cover material is suitably arranged so that the web 412 of cover material can be presented to the combination cutting and sealing die 408. Conventional rollers 414 and 416 perform this function.

Figure 9:
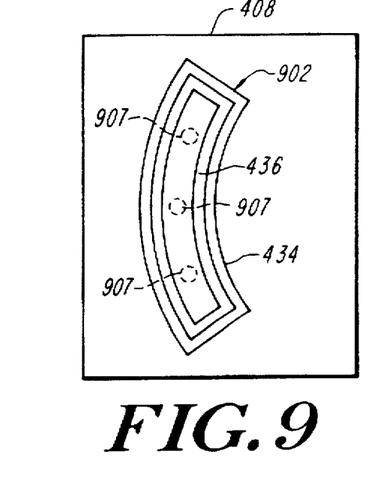
FIG. 9 is a plan bottom view of a combination sealing and cutting die shown schematically in FIG. 4.

The two webs 402 (fastening elements) and 410 (cover) are mated at the combination cutting and sealing die 408, which has one or multiple dies 902 (shown in FIG. 9 from the bottom) for simultaneously cutting out fastening components of the desired shape and sealing the cover 30 to the fastening element 14. In the case shown, for simplicity, a single die cuts and seals a single shape 10 on each cycle. In the embodiment shown, the die reciprocates up and down, in the directions indicated by the two headed arrow S. Four already cut pieces, $10_a$, $10_b$, $10_c$, and $10_d$, are shown falling in a stream from the combined webs 402 and 410 and the sealing and stamping die 408 into a collection container 420. At the cutting and sealing die, the two webs 412 and 402 are combined into single two layer web 422, due to the sealing action on the side of the cut that does not form part of the piece being manufactured, leaving a matrix of combined sheet and holes. The combined sheet matrix 422 moves on, in the machine direction, indicated by the arrow M, with holes 424 cut in the sheet. The locations of three holes, $424_a$, $424_b$ and $424_c$ are shown, from which were cut shaped components $10_a$, $10_b$ and $10_c$ respectively.

Figure 3:
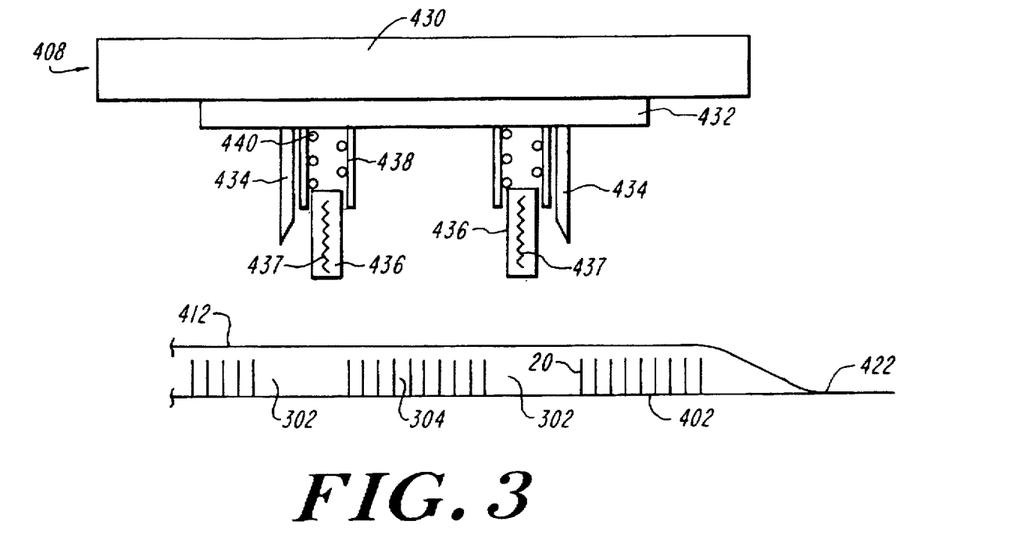
FIG. 3 is a cross-sectional side elevation view of a die for simultaneously cutting a shaped piece from a web of fastening elements and a web of a protective cover, and for heat sealing the two webs together, around their periphery.

A suitable combination cutting and sealing die 408 is shown schematically in cross-section in FIG. 3. A heated substrate 430 is connected to an insulator 432. The insulator reduces heat conduction into the die platen 430, thereby aiding in heating the blade 434 and reducing the heating load and the heater size. The insulator carries a fixed blade 434, also shown in FIG. 9 from the bottom, which is in the shape of the perimeter of the piece to be formed, like a conventional cookie cutter. The blade may be continuous, or, it may be made up of different segments. It is typically made of forged steel. Adjacent to the blade 434, is a spring loaded sealing platen 436, which is typically made of brass and has the heating element 437 embedded within it. It moves up and down inside a sleeve 438, and is urged to return to a rest position by a spring 440. The sealing platen 436 is also shown from the bottom in FIG. 9, and is sized and shaped to coincide with the perimeter region of the piece being formed where the protective cover is heat sealed to the base.

In operation, the combined webs 412 and 402 of cover and fastening elements respectively, with an already crushed perimeter region 302, is indexed into register with the cutting and sealing die 408. The die advances toward the piece, and the sealing platen 436 encounters the cover web 412 before the blade 434. The heated sealing platen 436 forces the cover web 412 into contact with the fastening element web 402, and heats both to a degree that they melt and are welded together to some degree. As the combined sealing and cutting die 408 continues to move downward, the sealing platen is forced to recede into the sleeve 438, and the heated blade 434 comes into contact with the joined cover and fastening element webs and cuts through both of them, leaving the central region 304 of fastening elements 20 enclosed within an envelope of the cover. The cut piece falls from the remaining web matrix.

Thus, any arbitrarily shaped piece can be cut, and the protective cover will be secured to the shape around the perimeter sufficiently to prevent foam material from intruding into the fastening elements. There is no need for adhesives, and there is no need to be limited to shapes that are generally rectangular or straight sided in shape. The apparatus can seal the component fully around any arbitrary shape. This has a great advantage over the use of relatively thin strips of protective material adhered along straight marginal edges, which are only conducive to use in rectangular strip pieces.

As mentioned above, there may be a reason to have the cover adhered to the fastening elements base inside the region of fastening elements, in addition to around the perimeter. In such a case, additional sealing platens 907 (FIG. 9) can be provided inside the fastenings.

The cover should be sufficiently impervious to molding material, over its surface, and around its perimeter, such that during the molding process, substantially no molding material can intrude into the region where the fastening elements are. The cover need not be absolutely impervious to every material, nor must the seal fully surround the perimeter. All that is necessary is that the surface of the cover be substantially impervious to the molding material, such that molding material is excluded from contacting the fastening elements. Similarly, it is only necessary that the perimeter be sealed to the extent that the perimeter is substantially impervious to the molding material, such that molding material is excluded from contacting the fastening elements. Thus, there may (although need not be) gaps in the heat seal around the perimeter, and the cover may be porous, to some degree.

A web of nylon hook material, with a hook shape such as is sold by Velcro USA under trade designation Ultra-8™, was heat sealed to a web of cover material made from a two layer, nylon and polyethylene film having a combined thickness of from 3.0 to 5.0 mils (thousandths of an inch) (0.076–0.127 mm) gauge respectively sold by John Romanowski and Associates of Londonderry, N.H. The cutting and sealing die had a sealing platen 436 temperature of 380° F. (193° C.) for a duration of from three to five seconds. In general, the thickness of the cover should be in the range of from three to five mils (0.076–0.127 mm).

Figure 5:
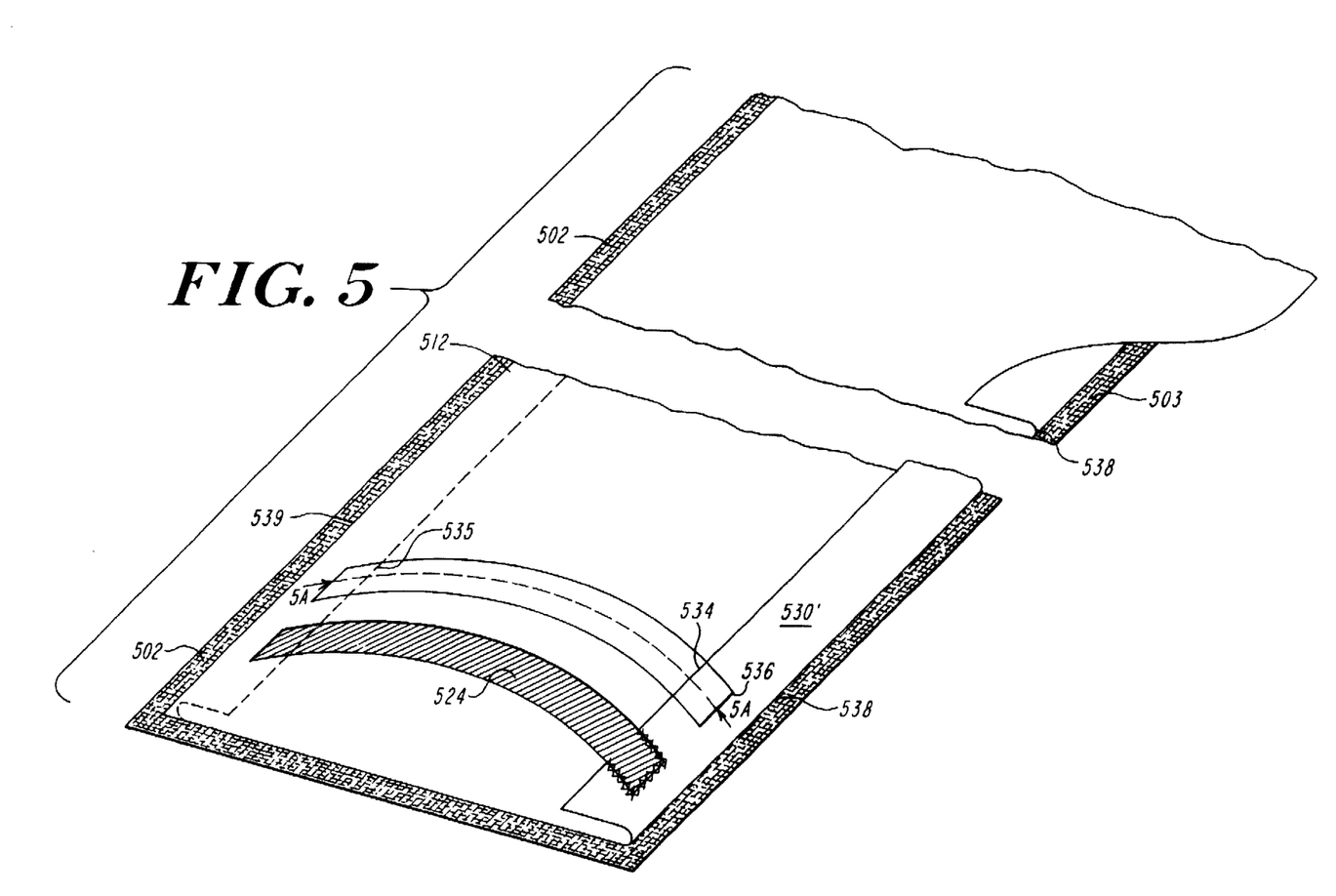
FIG. 5 is a schematic perspective view of an embodiment of the fastening element of the invention, having a protective cover with a pocket formed from a simple fold of the cover material.
Figure 5A:
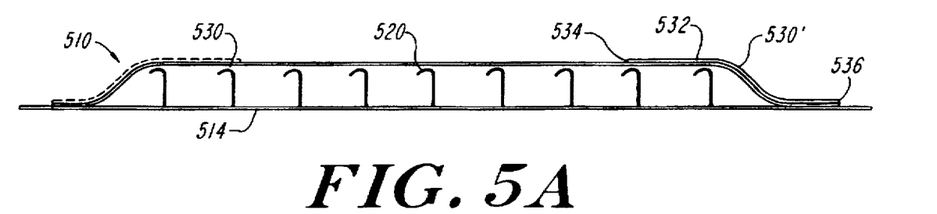
FIG. 5A is a schematic cross-sectional view of the fastener component being formed is shown in FIG. 5, along the lines 5A—5A.

Another preferred embodiment of the article of the invention is shown schematically with reference to FIGS. 5 and 5A. FIG. 5A shows a fastening component in cross-section and FIG. 5 shows a composite web of fastening element material 502 and cover material 512 from which a fastening component having a cover with a pull tab therein is being formed.

Turning first to the structure of the component, a fastening component 510 has a base 514 carrying hooks 520 as described above. A cover 530 is attached to the base 514 around the perimeter of the fastening component, as described above, typically by heat sealing. One side of the cover has a flap or pull tab of cover material that has been folded back on itself. Thus, from the open edge 534 of the flap 532 to the edge 536 of the fastening component near to the flap, the cover is two separate layers 530 and 530'. Both layers at the cut edge 536 of the flap are heat sealed together and the complex is heat sealed to the base 514.

FIG. 5A is a cross-section, along the lines 5A—5A of FIG. 5. FIG. 5 shows the web from which the composite pieces are being cut. One piece has already been cut from the hole 524 and the location where another is being cut upstream of the hole is shown. (The cutting die is not shown, to allow viewing the piece being cut.) The web of cover material 512 extends beyond a side edge 503 of the web 502 of fastening element material. The side of the leading edge of the cover material 512 has been folded back on itself, toward its center, to form the fold 538. This folding operation is typically conducted further upstream from the cutting and sealing station, such as by folding equipment 418 (FIG. 4). Conventional web folding machinery and techniques can be used.

The pull tab flap layer 530' is adhered securely to the main layer 530 of the cover, because it is heat sealed all around its perimeter, as indicated by the cross-hatching around the pocket end of the hole 524 in the remaining matrix.

Once the part has been formed with the cover and pull tab, it is used in a mold to become part of a molded article as described above. After the molding of the article is completed, the cover can be removed relatively easily by grasping the open edge 534 of the flap and pulling. The cover should be designed so that its tear resistance is greater than the tear strength of the heat seal around the perimeter of the part. Otherwise, the cover will tear into several pieces and would require extra care to remove. Alternatively, the part can be designed so that the main body of the cover tears from that portion that has been adhered to the base, due to weakening at that site caused by the heat sealing. It is also important that the bond that holds on the cover not be as strong as the bond that holds the fastening component to the molded article.

Figure 6:
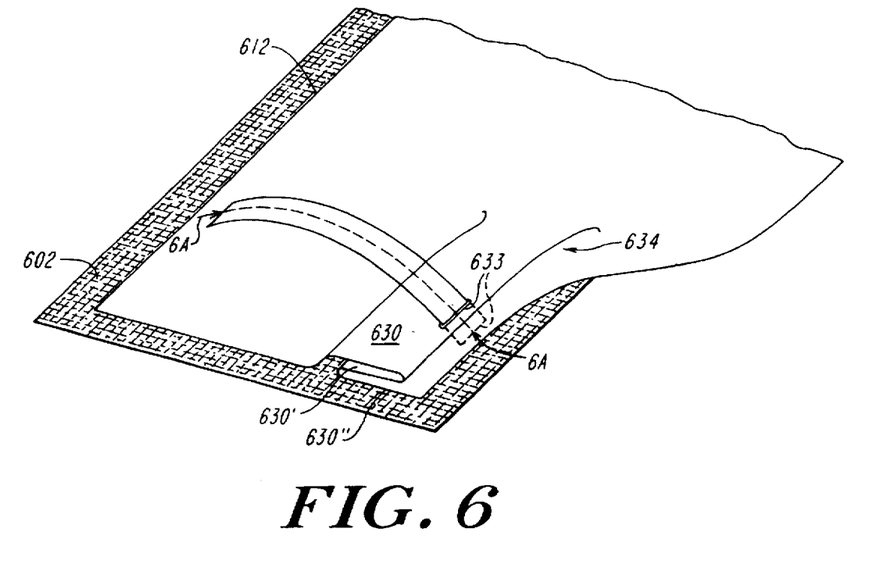
FIG. 6 is a schematic perspective view of an embodiment of the fastening element of the invention, having a protective cover with a pocket formed from a compound fold of the cover material.
Figure 6A:
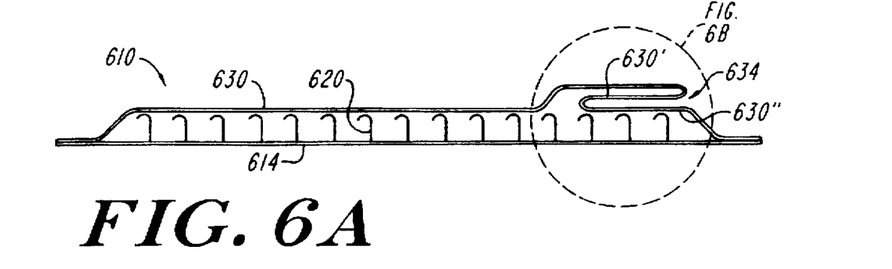
FIG. 6A is a schematic cross-sectional view of the fastener component being formed as shown in FIG. 6, along the lines 6A—6A.
Figure 6B:
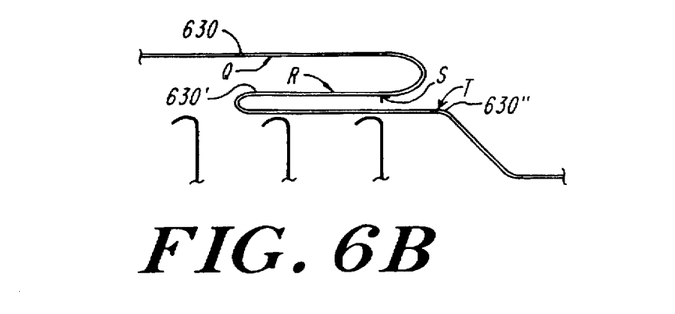
FIG. 6B is an enlargement of the portion B of FIG. 6A.

Another preferred embodiment of a pull tab is shown schematically with reference to FIGS. 6 and 6A. This embodiment is similar to that shown in FIGS. 5 and 5A, except that rather than a simple, two layer flap, it has a compound, three layer flap. This embodiment is typically used if an adhesive or low melt polyester is used as the layer facing the fastener. The cover material 612 is folded back upon itself twice, so that an "S" shaped fold arises, with three layers, 630 (outermost), 630' (middle) and 630" (closest to the fastening components). As indicated in FIG. 6, the cut edge 633 can be either inside of the edgeward fold line 634, as shown in solid line, or outside of the edgeward fold line 634, as shown in phantom. In either case, the adhesive or heat activated low melt temperature polymer, joins together the cover 630 and the base 602. As shown in FIG. 6B, it also joins together the two surfaces Q and R of the portions 630 and 630' that face each other. However, the faces S and T of the portions 630' and 630" that face each other are not sealed together, because they do not bear adhesive, or are not of low-melt temperature polymer. Thus, a free tab is formed between the faces of the segments 630' and 630". This tab forms whether the piece is cut with the fold 634 being inside of the part, as shown in the dotted line version of FIG. 6, or outside of the part, as shown in the solid line version.

As in the case of the simple flap shown in FIG. 5, the folding operation is typically done upstream at a folding station 418 (FIG. 4).

The simple pocket embodiment shown in FIG. 5 works well if the cover is of a coextruded film type. The compound pocket embodiment shown in FIG. 6 works well if the cover is of an adhesive backed film type or has a layer of low melt temperature polymer. If a low melt temperature polymer is used, the cover 630 is joined to the base by the heat techniques shown in FIGS. 3 and 4. If an adhesive is used for the layer of the cover that faces the base, the cover may be joined to the base in a separate step, or, if it is a heat activatable adhesive, as shown in FIGS. 3 and 4.

In general, the pull tab dimensions depend on the use to which the part will be put.

Other configurations of folding the web to form the tab are possible and contemplated as part of the invention. The fold should afford a flap that is graspable by a line operator or an automatic machine designed for that purpose.

Further, more than one tab can be incorporated into the cover. For instance, for the embodiment shown in FIG. 5 and 5A, both edges of the fastener can include the fold and the pull-tab. The second fold and pull-tab are shown in phantom at 539 and 535, respectively. More complex shapes may have three or more tabs.

If the cover and fastening component are of a size and shape that is conducive to ultrasonic welding, the cover can be folded, as described above, and ultrasonically welded to the base, and to itself to form the tabbed cover. Thus, in some cases, the tabbed cover of the invention need not be used in connection with the heat induced cover weld of the invention.

Figure 7:
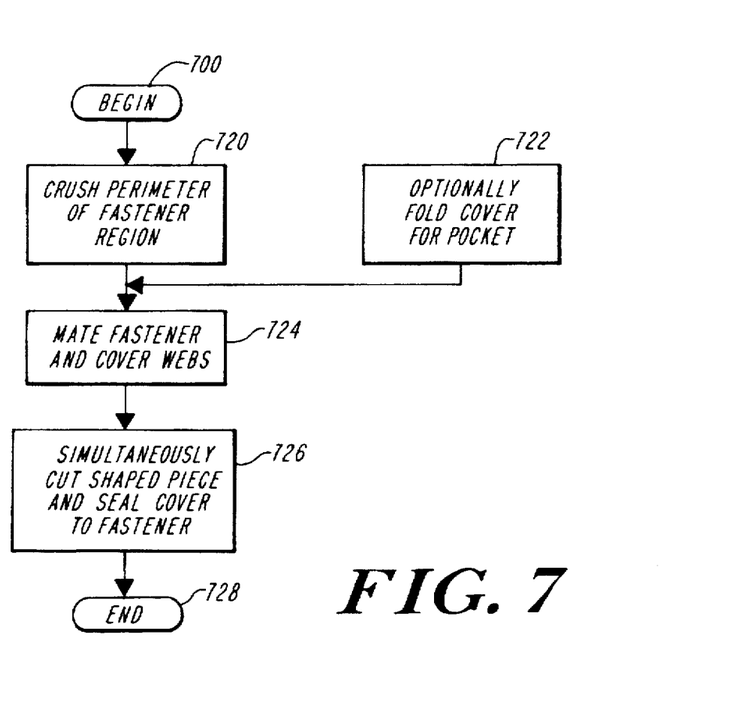
FIG. 7 is a schematic representation in block diagram form of an embodiment of the method of the invention of applying a protective cover to a fastening component.

The method of making the covered fastening component is illustrated schematically in flow chart form in FIG. 7. The process begins 700. Next, the perimeter region of fastening elements is crushed 720. (The crushing step is optional.) At the same time, if the cover will have a pocket as described in FIGS. 5 or 6, the cover is folded over 722. Following these operations, the webs of fastener material and cover material are mated 724, after which they are simultaneously 726 sealed together and cut into the desired shape by a hot die.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The cover may be any type of material that can prevent foaming material from fouling the hooks and that can be heat sealed to the base. It may be a conventional transparent plastic film, or a thin foam layer. It may have paper constituents. The apparatus can be used to make a part of any arbitrary shape. The heat seal is typically around the full perimeter, and may also be conducted at islands within the region of the fastening elements. The fastening elements may be hooks or loops, or any known substitutes. The base may include a magnetic attractant, and may also include a substrate that is different from the base material that forms the hooks. The pull tab may be a single fold type, or multiple folds. Adhesives may be used to augment or replace the heat sealing of the cover to the base. The molded article may be of foam, polystyrene or any other molded material.

Having described the invention, what is claimed is:

1. A method of making a fastening component comprising the steps of:
   a. providing a base layer carrying on a fastening surface a field of fastening elements;
   b. providing a protective sheet adjacent and overlying said base layer, such that a portion of said protective sheet overlies said field of fastening elements and a different portion of said protective sheet extends beyond said field of fastening elements;
   c. substantially simultaneously:
      i. cutting from said base layer and from said overlying protective sheet, a piece of each of a substantially congruent and coextensive shape; and
      ii. sealing said cut piece of said protective sheet to said cut piece of said base layer, substantially completely around the perimeter of said field of fastening elements.

2. A method of making a fastening component comprising the steps of:
   a. providing a base layer carrying on a fastening surface a field of fastening elements;
   b. providing a protective sheet adjacent and overlying said base layer, such that a portion of said protective sheet overlies said field of fastening elements and a different portion of said protective sheet extends beyond said field of fastening elements;

c. substantially simultaneously:
   i. cutting from said base layer and from said overlying protective sheet, a piece of each of a substantially congruent and coextensive shape; and
   ii. adhering said cut piece of said protective sheet to said cut piece of said base layer, substantially completely around the perimeter of said field of fastening elements.

3. The method of claim 2, said substantially simultaneous cutting and adhering step comprising the step of cutting said base layer and said overlying protective sheet substantially simultaneously with the same hot blade, while pressing said base and protective sheet layers together with a hot die that adheres said protective sheet to said base layer by thermal processes.

4. The method of claim 2, said substantially simultaneous cutting and adhering step comprising the step of cutting said base layer and said overlying protective sheet substantially simultaneously with a die, which adheres said protective sheet to said base layer by ultrasonic processes.

5. The method of claim 2, further comprising, before said step of substantially simultaneously cutting and adhering, the step of substantially flattening a region of said fastening elements along a perimeter region of said base layer.

6. The method of claim 5, said step of flattening said fastening elements comprising the step of flattening a region of said fastening elements substantially around the entire perimeter of said field of fastening elements on said base layer.

7. The method of claim 2, said shape comprising an arcuate shape.

8. The method of claim 2, said shape comprising a parallelepiped shape.

9. The method of claim 2, said step of providing a protective sheet adjacent and overlying said base layer, comprising the step of coextruding said base layer and said protective cover simultaneously.

10. The method of claim 2 said protective sheet comprising an adhesive covering the surface of said sheet that is adjacent to said fastening surface of said base layer.

11. The method of claim 2, said base layer comprising a sheet having an elongated machine direction and a perpendicular width, said shape to which said fastening component is cut being generally elongated, with said long dimension of said fastening component being substantially parallel to said width of said sheet of base layer.

12. A method of making a fastening component comprising the steps of:
   a. providing a base layer carrying on a fastening surface a field of fastening elements;
   b. providing a protective sheet adjacent and overlying said base layer, such that a portion of said protective sheet overlies said field of fastening elements and a portion of said protective sheet extends beyond said field of fastening elements;
   c. folding said extending portion of said protective sheet back onto said portion of said protective sheet that overlies said field of fastening elements;
   d. cutting said base layer and said overlying protective sheet and a portion of said folded over extending portion of said protective sheet to a substantially coextensive, shape; and
   e. adhering said protective sheet to said base layer, substantially completely around the entire perimeter of said field of fastening elements.

13. The method of claim 12, said step of folding said extending portion of said protective sheet comprising the step of folding said sheet onto itself in a simple fold with exactly one crease.

14. The method of claim 12, said step of folding said extending portion of said protective sheet comprising the step of folding said sheet onto itself in a compound fold with at least two creases.

15. The method of claim 13, said cut shape being generally elongated, said folding step resulting in an open edge that opens toward the center of the elongated dimension of said shape.

16. The method of claim 12, said base layer comprising a sheet having an elongated dimension and a perpendicular width, said preselected shape to which said fastening component is cut being generally elongated, with said long dimension of said fastening component being generally aligned with said width of said sheet of base layer.

17. A method of making a fastening component comprising the steps of:
   a. providing a base layer carrying on a fastening surface a field of fastening elements;
   b. providing a protective sheet adjacent and overlying said base layer, such that a primary portion of said protective sheet overlies said field of fastening elements and a secondary portion of said protective sheet extends beyond said field of fastening elements;
   c. folding said extending portion of said protective sheet back onto said portion of said protective sheet that overlies said field of fastening elements; and
   d. substantially simultaneously:
      i. cutting a piece from said base layer and a piece from said overlying protective sheet and a portion of said folded over extending a portion of said protective sheet, said pieces of said base layer and said protective sheet comprising a substantially coextensive, shape; and
      ii. adhering said cut piece of said protective sheet to said cut piece of said base layer, substantially completely around the entire perimeter of said field of fastening elements.

18. The method of claim 17, said substantially simultaneous cutting and adhering step comprising the step of cutting said base layer and said overlying protective sheet substantially simultaneously with the same hot blade, while pressing said base and protective sheet layers together with a hot die that adheres said protective sheet to said base layer by thermal processes.

19. The method of claim 17, said substantially simultaneous cutting and adhering step comprising the step of cutting said base layer and said overlying protective sheet substantially simultaneously with a die, which adheres the sheet to said base layer by ultrasonic processes.

20. The method of claim 17, said step of substantially simultaneously cutting and adhering further comprising the step of substantially flattening a region of said fastening elements along an outer region of said base layer.

21. The method of claim 20, said step of flattening said fastening elements comprising the step of flattening a region of said fastening elements substantially around the entire perimeter of said field of fastening elements on said base layer.

22. The method of claim 19, said preselected shape comprising an arcuate shape.

23. The method of claim 19, said preselected shape comprising a parallelepiped shape.

24. The method of claim 19, said step of providing a protective sheet adjacent and overlying said base layer, comprising the step of coextruding said base layer and said protective cover simultaneously.

25. The method of claim 19, said protective sheet comprising an adhesive covering the surface of said sheet that is adjacent to said fastening surface of said base layer.

26. The method of claim 19, said step of folding said extending portion of said protective sheet comprising the step of folding said sheet back onto itself in a simple fold with exactly one crease.

27. The method of claim 19, said step of folding said extending portion of said protective sheet comprising the step of folding said sheet back onto itself in a compound fold with at least two creases.

28. The method of claim 27, said cut shape being generally elongated, said folding step resulting in an open edge that opens toward an elongated end of said shape.

29. The method of claim 26, said cut shape being generally elongated, said folding step resulting in an open edge that opens toward the center of the elongated dimension of said shape.

30. The method of claim 27, said base layer comprising a sheet having an elongated direction and a perpendicular width, said shape to which said fastening component is cut being generally elongated, with said long dimension of said fastening component being generally aligned with said width of said sheet of base layer.

* * * * *

UNITED STATES PATENT AND TRADEMARK OFFICE
CERTIFICATE OF CORRECTION

PATENT NO. : 5,766,385
DATED : June 16, 1998
INVENTOR(S) : Pollard et al.

It is certified that error appears in the above-indentified patent and that said Letters Patent is hereby corrected as shown below:

Column 13, line 39, correction in text:

after "claim 2" insert a comma --,-- to read:

"The method of claim 2, said protective sheet"

Column 14, line 35, correction in text:

after "extending" delete "a" to read:

"extending portion of said protective sheet"

Signed and Sealed this

Twenty-ninth Day of September, 1998

Attest:

BRUCE LEHMAN

Attesting Officer        Commissioner of Patents and Trademarks